United States Patent [19]

Fields

[11] 4,400,724
[45] Aug. 23, 1983

[54] VIRTUAL SPACE TELECONFERENCE SYSTEM

[75] Inventor: Craig I. Fields, Washington, D.C.

[73] Assignee: The United States of America as represented by the Secretary of the Army, Washington, D.C.

[21] Appl. No.: 271,062

[22] Filed: Jun. 8, 1981

[51] Int. Cl.³ .............................................. H04H 7/18
[52] U.S. Cl. ....................................... 358/85; 358/93; 179/2 TV; 179/1 CN; 179/2 TS
[58] Field of Search ................ 358/85, 93; 179/2 TV, 179/1 CN, 1 TS

[56] References Cited

U.S. PATENT DOCUMENTS

| | | | |
|---|---|---|---|
| 3,519,744 | 7/1970 | Dorros et al. | 179/2 TV |
| 3,601,530 | 8/1971 | Edson | 179/2 TV |
| 3,700,792 | 10/1972 | Harrison et al. | 315/18 |
| 3,725,587 | 4/1973 | Klein | 179/2 TV |
| 3,775,563 | 11/1973 | Klein | 179/2 TV |
| 4,054,908 | 10/1977 | Poirier | 358/85 |

FOREIGN PATENT DOCUMENTS 1173918  1/1966  United Kingdom ............. 179/2 TS

OTHER PUBLICATIONS

Brown et al., "A Continuous Presence Video Conferencing System", 12-3-78, NTC-78 Conference Record of the IEEE, pp. 34.1–34.4.

Primary Examiner—Robert L. Griffin
Assistant Examiner—Edward L. Coles

Attorney, Agent, or Firm—William C. Gapcynski; Arthur I. Spechler; Werten F. W. Bellamy

[57] ABSTRACT

A teleconference system for N conferees, N being greater than two, includes at least two separate stations. Each station has N conferee positions, confronting a virtual conference space, and corresponding conferee positions at each station have the same relative locations about the virtual conference space. At least one conferee position at each station is adapted to be occupied by a conferee in person. Surrogate conferees, which include a video display, a video camera, and a loudspeaker, occupy each conferee position not adapted to be occupied by a conferee in person. Each video display faces one conferee and displays the image of another conferee at a corresponding position at another station; the loudspeaker reproduces the voice of the other conferee. The video camera forms image signals of the one conferee and couples these signals to the display device of a surrogate conferee at a conferee position corresponding to the position of the one conferee at the other station. The system includes a shared graphic display system. A video display device is positioned at the center of the virtual conference space and has a display screen at about the level of a table top. A target area for each conferee is scanned by an overhead video camera, and the target image signals are combined for display on the screens in the table tops at each station. Images from a video storage device are also combined in the composite signal. The display devices and cameras at each station are so oriented with respect to the virtual conference space that the target images from each station will appear on the screen as oriented the same as the conferee at that station.

17 Claims, 12 Drawing Figures

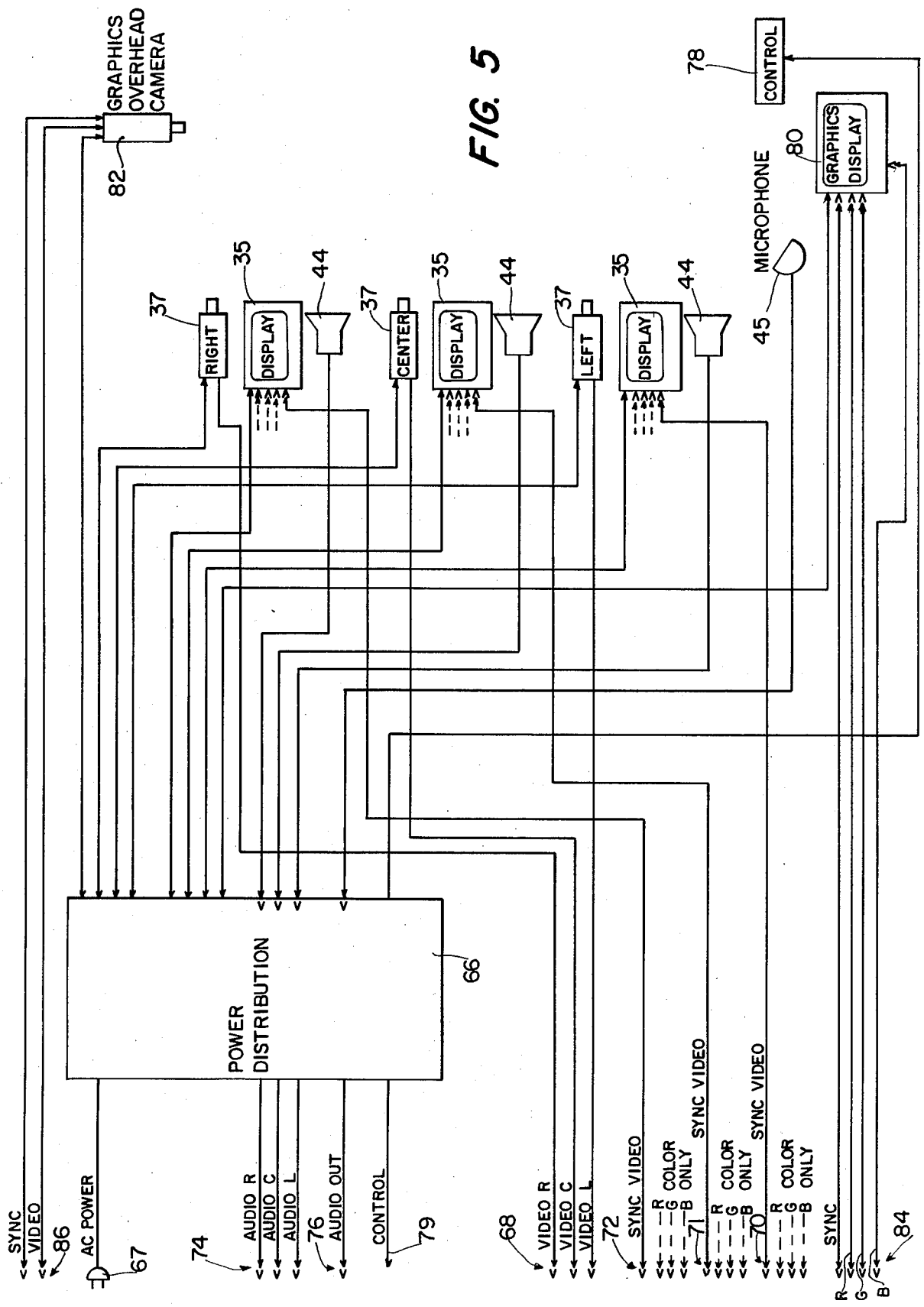

VIRTUAL SPACE TELECONFERENCE SYSTEM

The invention described herein may be manufactured, licensed and used by or for the Government for governmental purposes without the payment of any royalties thereon.

BACKGROUND OF THE INVENTION

This invention relates to teleconference systems and, more particularly, to systems of this character for three or more conferees.

When an important meeting must be convened, and the participants are distant from each other, considerable cost may be incurred for transportation and expenses. Travel time may be an inefficient use of personnel time, may delay action, and fatigue may reduce personnel effectiveness. One way to overcome these problems is to conduct a video teleconference, which allows people in separate locations to meet by means of video cameras and monitors or viewing screens. Each person looks at the others on a TV monitor, and voices are transmitted over audio channels. However, the promise of teleconferencing has not been completely fulfilled in the form of widespread acceptance. This is true, at least in part, because the systems of the prior art themselves introduce unnatural arrangements that interfere with normal conversation.

In the video conference systems shown, for example, in Edson et al, U.S. Pat. No. 3,601,530; Dorros et al, U.S. Pat. No. 3,519,744; and Poirier et al, U.S. Pat. No. 4,054,908 an audio signal developed in response to the conferee presently talking enables the video camera aimed at that conferee. Thus, one conferee at a time is displayed on the video monitor of each of the conferees.

It has also been proposed in United Kingdom Pat. No. 1,173,918; Klein, U.S. Pat. No. 3,725,587; and Klein, U.S. Pat. No. 3,775,563 to display all conferees simultaneously on respective parts of a single television screen. These systems also result in an unnatural arrangement.

Recent experiments at Bell Telephone Laboratories described by E. F. Brown, J. O. Limb and B. Prasada in a paper published in Birmingham, Alabama: Conference Record, 1978 IEEE National Telecommunications Conference, Dec. 1978, at pp. 34.1.1–34.1.4, involved an arrangement of video pictures to give a panoramic view of the "far room", displaying all participants simultaneously, maintaining the same spatial relationship from site to site to give the illusion of a face-to-face meeting. The illusion was further enhanced with the use of stereo for the audio signals which aided the participants in detecting the source of the speech, allowing more than one conversation at a time. While this resulted in an improved conference system, the authors recognized that "distance effect", while reduced, was still present. This was most noticeable when a conferee turned toward and talked to his neighbor. While the authors suggest that this might be minimized by training conferees to converse with the television display when talking to a neighbor, they conclude that the problem may never be completely solved.

It is thus apparent that there are substantial drawbacks when a teleconference system distorts spatial arrangements, for example, by collapsing individuals occupying different positions onto a display screen occupying one position, making the individuals spatially indistinguishable.

SUMMARY OF THE INVENTION

It is, therefore, an object of the invention to provide an improved teleconference system which provides a naturalistic rendition of a physical space and the simulation of a face-to-face conference.

The present invention employs the concept of a "virtual space" to create at each site, or station, the essential spatial relationships which would occur if all conferees were present at each site. To this end, use is made of a "conferee surrogate" as a "stand-in" for a corresponding conferee at each site where the conferee is not physically present. A "conferee surrogate" is a video display and loudspeaker presenting the face and sound of its corresponding remote conferee, together with a video camera pointing in the same direction as the display and microphone, acting as the corresponding conferee's "eyes" and "ears" at that site.

A virtual space teleconference system according to the invention will accommodate N conferees, where N is greater that two, and consists of at least two sites, or stations. Each site may teleconfer simultaneously with as many other sites as are represented by a conferee surrogate.

Each site, or station, has N conferee positions. A conferee position is defined as a spatial position, which may be occupied either by a conferee in person or by a surrogate conferee, confronting a virtual conference space. Each conferee position in each site has a corresponding conferee position in each other active site. Each has its "positions" arranged in a spatially similar arrangement: the sight lines between conferee positions at each station have the same angular relation as the sight lines between corresponding conferee positions in every other station. A pair of conferees and/or conferee surrogates "correspond" if they occupy corresponding conferee positions. Conferees never correspond; that is, two conferees never occupy corresponding conferee positions. At least one of the conferee positions at each site is an "actual" position adapted to be occupied by a conferee in person. Each conferee can view the conferees at other sites by viewing, face-on, the video display of one conferee surrogate for each other conferee displaying the image of the other conferee from another station. The video camera of the one surrogate views the actual position along the same sight line as the video display and forms an image of the actual position. This image is coupled to the display of the surrogate conferee at a conferee position corresponding to the actual conferee position at the other station.

Preferably, the conferee positions at a site are located symmetrically about the virtual conference space. In the generalized case of N conferees, each conferee position at a site is located at the corner of an N-sided equilateral figure. The center of the virtual conference space coincides with the center of the figure. If, for example, there are four conferees, the conferee positions are located at the corners of a square; and the center of the square determines the center of the virtual conference space.

It is a further feature of the invention to provide, at each site, a video display device at the center of the virtual conference space. This display device, which may be termed an "electronic blackboard" or an "electronic table top", is located substantially at the level of a table or desk and is in position to be viewed by a conferee seated at one of the actual conferee positions. The image displayed on the table top display device at each site may be derived from a common storage device, such as a video disc storage device, and/or from peripheral devices, such as a digital tablet provided for use by one or more conferees. In addition, a conferee may share material, such as a book, map or note, with other conferees by introducing it into a target space located on the table top between a conferee position occupied by a conferee in person and the table top display device. Such a target space at each site is scanned by an overhead video camera, and the image signals from the overhead cameras at the several sites are combined with the image signals from the storage device and/or peripheral devices to form a composite image. When these image signals are combined, the intensity of the signals of the target spaces may be reduced so as to make the images of objects within the target spaces distinguishable on the display device.

Although images of the target spaces appearing on all of the table top display devices may have the same orientation, it is within the purview of the invention to orient these images differently to maintain the illusion of the virtual conference space. To this end, overhead cameras and table top display devices are turned so that the image of each target space is properly oriented in relation to the vertical conference space. For example, when a conferee's hand enters a target space, the image of the hand will appear on all table top display devices to be coming from the direction of that conferee. By virtue of the different physical orientation of the display devices, the images from the storage device, or the peripheral devices, are oriented differently on each table top display device. This orientation may be changed through the use of electronic image rotators so that these images may be rotated to be right side up for a particular conferee position. The images of the target spaces may also be rotated by the use of image rotators.

These and other objects, features and advantages of the invention will become more readily apparent from the following detailed description of the invention taken together with the accompanying drawings.

BRIEF DESCRIPTION OF THE DRAWINGS

FIG. 5 is a circuit diagram of one of the stations of the system.

DETAILED DESCRIPTION

Although the principles of the present invention are applicable to any situation involving three or more conferees at at least two separate sites or stations, for the purposes of exposition the teleconference system of the invention will be described with reference to an exemplary embodiment for four conferees at four separate sites.

Figure 1:
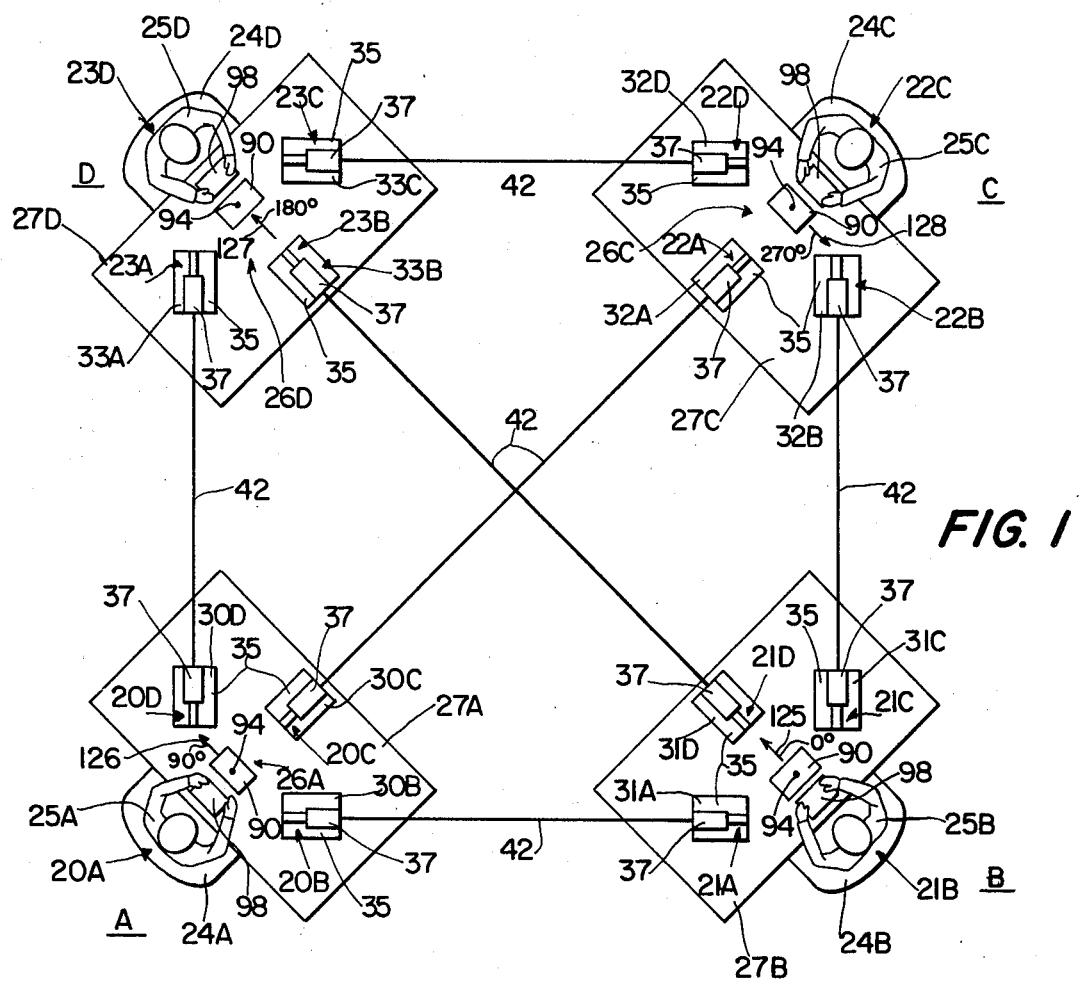
FIG. 1 is a schematic diagram depicting a teleconference system of the invention.

Referring to the schematic diagram of FIG. 1, it will be seen that a teleconference system according to the invention has four separated stations: A, B, C and D. Station A has four conferee positions 20A, 20B, 20C and 20D confronting a "virtual conference space" 26A. Stations B, C and D have corresponding conferee positions 21A, 21B, 21C, and 21D; 22A, 22B, 22C and 22D; and 23A, 23B, 23C and 23D, respectively, confronting corresponding virtual conference spaces 26B, 26C and 26D.

Turning specifically to station A, it will be noted that conferee position 20A is an "actual" conferee position provided with a chair 24A adapted to be occupied by a conferee 25A in person seated at a desk or table 27A. The remaining conferee positions 20B, 20C and 20D are occupied by surrogate conferees 30B, 30C and 30D, respectively, each of which includes a video display device 35, which faces the actual conferee position 20A, and a video camera 37. The camera 37 of each surrogate is aimed along the same sight line as its associated display device 35 to actual conferee position 20A. It will be observed that there is a particular angular relation among the sight lines at station A. Conferee position 20A is directly opposite conferee position 20C, while conferee positions 20D and 20B are seen from position 20A as 45° to the left and 45° to the right, respectively. Although surrogate conferees 30B and 30D face conferee position 20A it will be observed that the "sight" line between positions 20B and 20D is directly across virtual conference space 26A and that the "sight" lines between conferee position 20C and conferee positions 20B and 20D form 45° angles with the sight line between 20A and 20C.

At station B, actual conferee position 21B includes a chair 24B for conferee 25B who is seated directly across virtual conference space 26B from surrogate conferee 31D at position 21D. The display device 35 and video camera 37 of surrogate 31D are aimed along the same sight line at conferee position 21B. The display device 35 and camera 37 of surrogate 31A at position 21A views position 21B along a 45° angle to the left of 21B, while the display device 35 and camera 37 of surrogate 31C at position 21C views position 21B from a 45° angle to the right of 21B. It will be noted that positions 21A and 21C are directly opposite and that these positions are "seen" along "sight" lines 45° to the right and left of position 21D.

At station C, conferee 25C at position 22C has much the same spatial relationships to surrogate conferees 32A, 32B and 32D as will be apparent from the figure. Again, the surrogate conferees include video display devices 35 and video cameras 37 which are aimed, respectively, along sight lines from positions 22A, 22B and 22D at position 22C, where conferee 25C is seated in chair 24C.

Station D has the same spatial arrangement among positions 23A, 23B, 23C and 23D. Surrogate conferees 33A, 33B and 33C each have video display devices 35 and video cameras 37 aimed at conferee position 23D, where conferee 25D is seated in chair 24D. The surrogate conferees 23A and 23C have a sight line between them across virtual space 26D which has 45° relationships with lines connecting these positions with position 23D.

As will be apparent from FIG. 1, stations A, B, C and D include virtual conference spaces 26A, 26B, 26C and 26D, respectively, which are confronted by the four conferee positions of the station. The sight lines between conferee positions at each station have the same angular relation as the sight lines between corresponding conferee positions at the other stations. This creates the illusion of virtual space. To a conferee at, for example, position 20A, the image of the conferee at position 20C appears to be directly across the table, while the images at positions 20D and 20B appear to be at his left and right, respectively. When, for example, the conferee at position 23D of station D looks at the image of the conferee at position 23C, it will appear from the vantage point of conferee 25A as if conferee 25D is looking to his left at conferee 25C.

Figure 2:
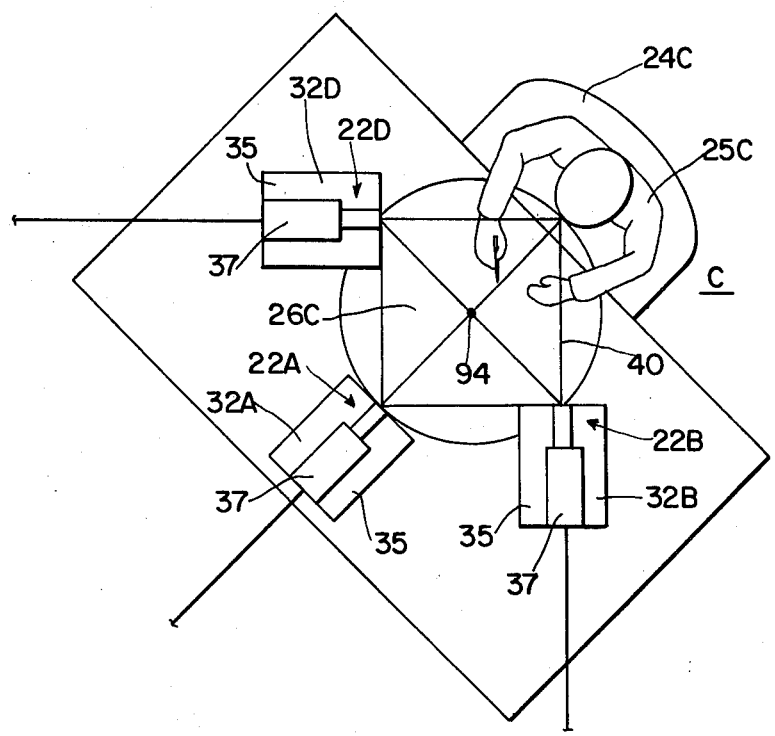
FIG. 2 is a schematic diagram of one site, or station, of the system.

A preferred spatial arrangement, providing the best simulation of a "real" conference is shown in FIG. 2. The conferee positions are placed at the corners of an equilateral figure, having the same number of corners as there are conferees. In the example shown, which is for four conferees, the equilateral figure is a square 40. The face of conferee C is at one corner of the square, and the faces of the display devices 35 and video cameras 37 of the surrogate conferees are located, respectively, at the other corners of the square.

Referring again to FIG. 1, it will be seen that links 42 are provided coupling surrogate 30B, 30C and 30D of station A to respective surrogates 31A, 32A and 33A at stations B, C and D, coupling surrogates 31C and 31D of station B to respective surrogates 32B and 33B at stations C and D, and coupling surrogate 32D at station D to surrogate 33C at station D.

Figure 3:
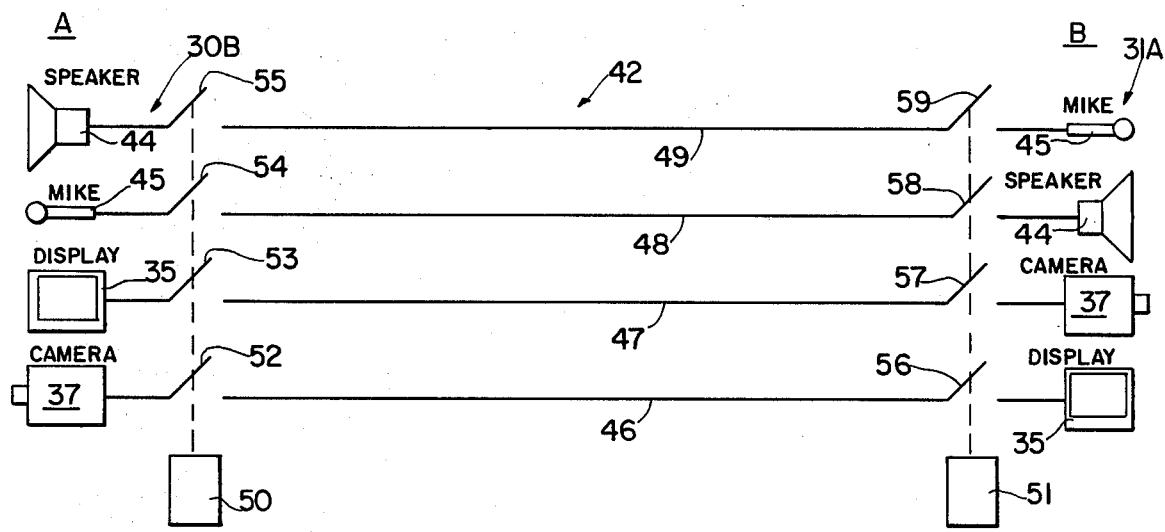
FIG. 3 is a schematic circuit diagram showing a link between two surrogate conferees at two stations of the system.

A typical coupling link 42 is shown in FIG. 3, showing, as an example, the link coupling surrogates 30B of station A and 31A of station B. Surrogates 30B and 31A each include a video display device 35, a video camera 37, a loudspeaker 44, and a microphone 45. The camera 37 of surrogate 30B is connected through a coaxial cable 46 to the display device 35 of surrogate 31A. A second coaxial cable 47 connects the camera 37 of surrogate 31A to the display device 35 of surrogate 30B. Audio or telephone lines 48 and 49, respectively, connect microphone 45 of surrogate 30B to loudspeaker 44 of surrogate 31A and microphone 45 of surrogate 31A to loudspeaker 44 of surrogate 30B. As will be shown in FIG. 5, a control box is provided at each "actual" conferee position and includes control switches governing interconnections between stations. These switches control relays, such as relays 50 and 51 which operate sets of switches 52, 53, 54 and 55 and 56, 57, 58 and 59 in the respective lines 46, 47, 48 and 49. Such controls are available to each conferee. Hence, two such relays and sets of switches are provided in each link 42 to enable a conferee to control communication with another conferee at another station.

Figure 4:
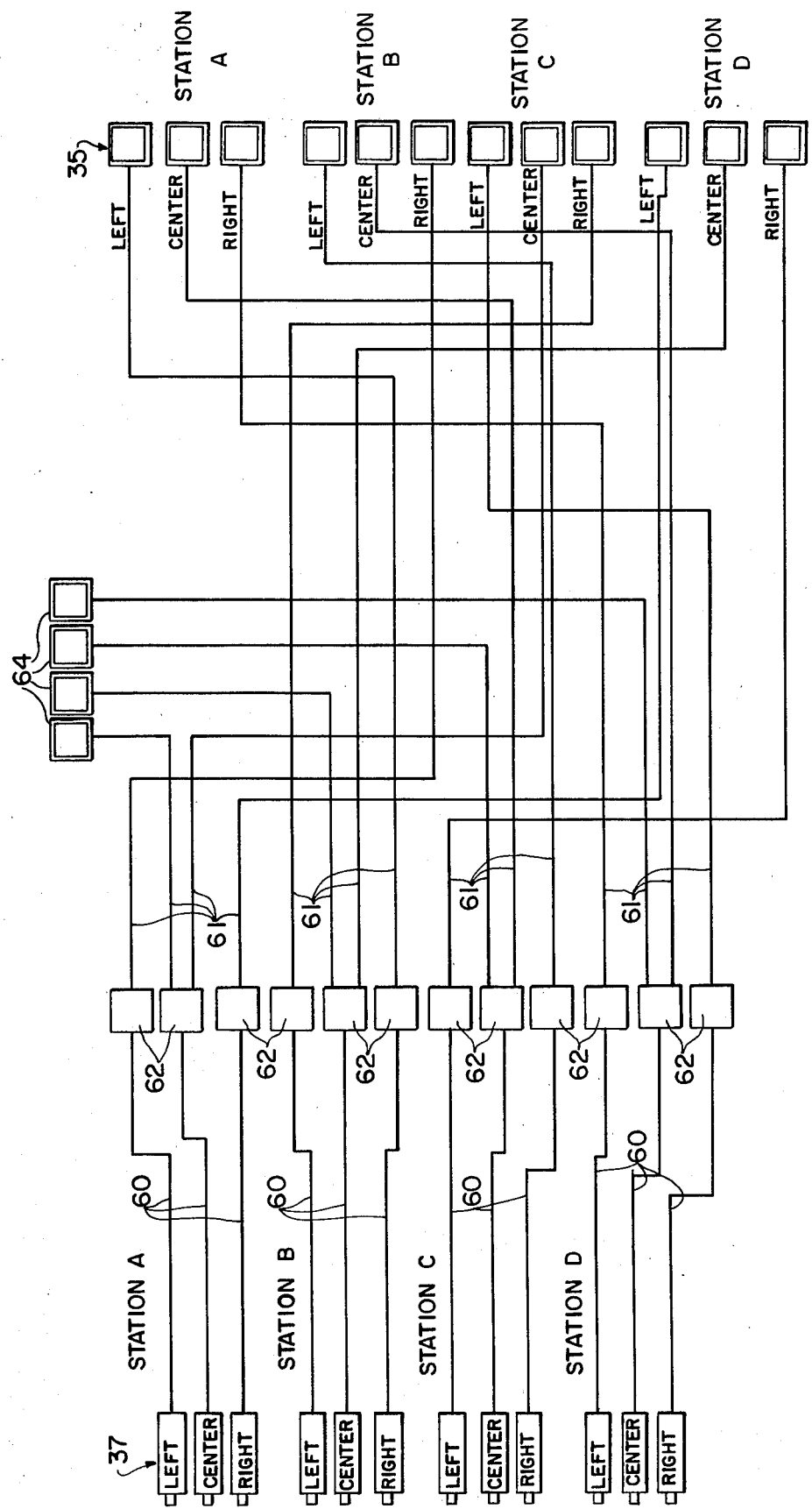
FIG. 4 is a schematic circuit diagram showing interconnections among the stations of the system.

The video interconnections at the teleconference system of FIG. 1 are illustrated more clearly in the schematic diagram of FIG. 4, where the aforementioned switches have been omitted for the sake of clarity. All of the video cameras 37 are shown at the left side of the diagram and comprises four sets of cameras for the "left", "center" and "right" positions at each station A, B, C and D. It is to be understood that the directions "left" and "right" are the directions from the vantage point of a surrogate facing the conferee. These are coupled through coaxial cables 60 to line drivers 62, which may be omitted if not needed, and then through cables 61 to respective video display devices as shown. The "left", "center" and "right" cameras of station A are respectively connected to the "right" display of station B, the "center" display of station C, and the "left" display of station D. The "left", "center" and "right" cameras of station B are connected respectively to the "right" display of station C, the "center" display of station D, and the "left" display of station A. The "left", "center" and "right" cameras of station C are connected respectively to the "right" display of station D, the "center" display of station A, and the "left" display of station B. From station D, the "left", "center" and "right" cameras are connected, respectively, to the "right" display of station A, the "center" display of station B, and the "left" display of station C. In addition, four display monitors 64 are connected to receive the signals from the four "center" cameras at the four stations to provide for monitoring in a control room.

A circuit diagram of an individual station is shown in FIG. 5. A power and distribution device 66 is connected to a source of AC power throgh a plug 67 and supplies operating power to the remaining components at the station. These include the "right", "center" and "left" video cameras 37 which provide the "right", "center" and "left" video signals to connector terminals 68. The incoming "left", "center" and "right" video and synch signals for video display devices 35 are received through connector terminals 70, 71 and 72. As indicated in dash line at these terminals and at display devices 35, additional lines may be provided for the R, G and B signals needed for color display devices, if these are desired. A loudspeaker 44 is provided adjacent each of the video displays 35. These loudspeakers receive their audio signals through power and distribution device 66 from connector terminals 74. A microphone 45 provides such audio signals to other stations through power and distribution device 66 to connector terminal 76. A control box 78 is provided for the conferee at the station shown in FIG. 5. This box includes switches for controlling relays operating switches for interconnecting stations as illustrated in FIG. 3. Since these relays are provided at a central control room (not shown), the control signals from box 78 are coupled through unit 66 to a connector terminal 79.

FIG. 5 also illustrates features of a table top graphic display system of the invention which will be described in greater detail hereinafter. This system includes a video graphic display device 80 mounted in a table top at an actual conferee position and located at the center of the virtual conference space of the station. A target area, which will be described more fully below, is located between the conferee and graphic display 80. An overhead video camera 82 is placed above the target area to provide an image to be combined in a composite image displayed on graphic display 80. The video and synch signals of this composite image are received by display device 80 through connector terminals 84. Since display device 80 is a color display device, these signals would include R, G and B signals as shown. The synch and video signals to and from overhead camera 82 are provided to connector terminals 86.

Figure 6:
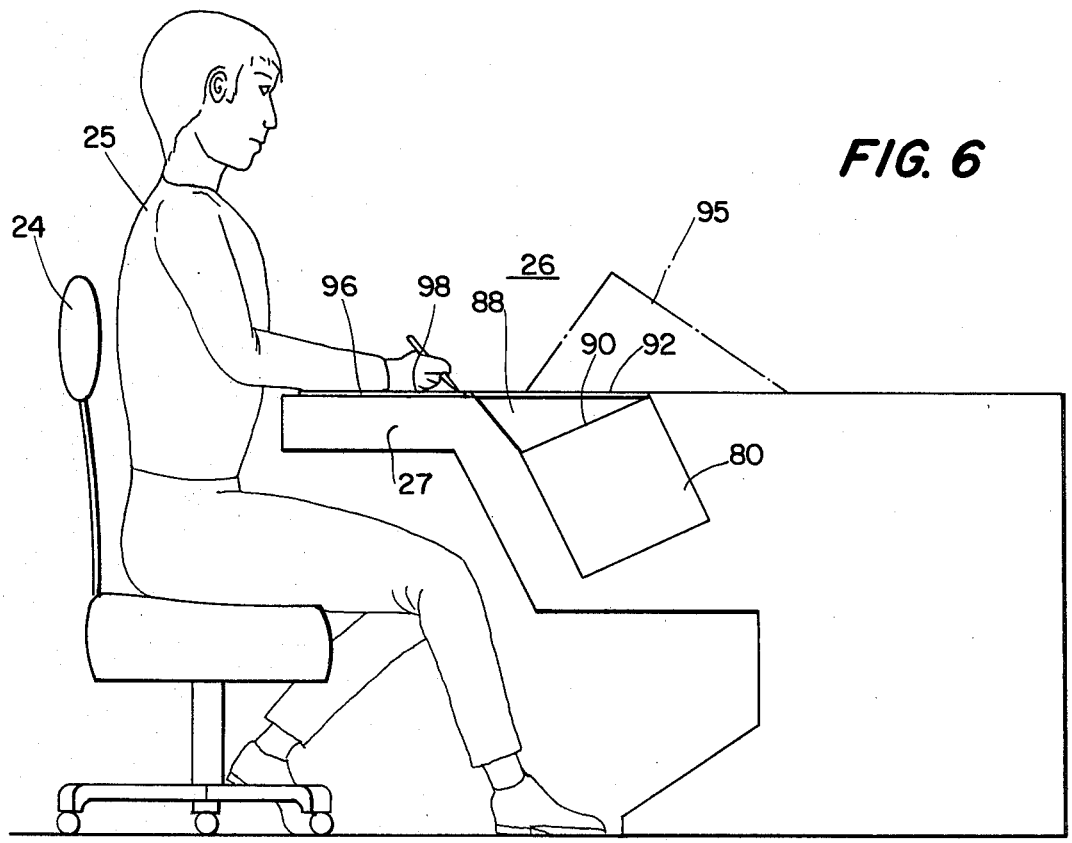
FIG. 6 is a side view showing a conferee position of a station of the system and illustrating the table top display feature.

Typical structural forms of the table top graphic display system of the invention are shown in FIG. 6. The conferee 25 is seated in a chair 24 at an actual conferee position of the teleconference system. The table or desk 27 in front of the conferee has a recess 88 within which a video graphic display device 80 is positioned with its display screen 90 angled for viewing by conferee 25. In order to maintain a smooth, flat table top, a transparent panel 92, of glass or plastic, covers the open side of recess 88. For the most accurate simulation of a display in virtual space, the center of display device screen 90 is positioned at the center 94 (see FIGS. 1 and 2) of virtual space 26. A target area 96 is provided between conferee 25 and recess 88, as close to display screen 90 as possible. This target area is defined by a black rectangular panel 98 lying in target area 96. Overhead camera 82 is positioned above panel 98 for forming an image signal of objects within target area 96. A conferee may, for example, place an object, such as a map or note into the target area. The image will be displayed on screen 90 as part of a composite image as will be described below. The conferee may also point with his finger, or some other pointer, to a spot in target area 96 corresponding to a spot on screen 90 to provide an image of the pointer directed at a point on the composite image. As shown in dash line at 95, the display device may also protrude slightly above the surface of table 27; the screen is angled for easy viewing by conferee 25.

Figure 7:
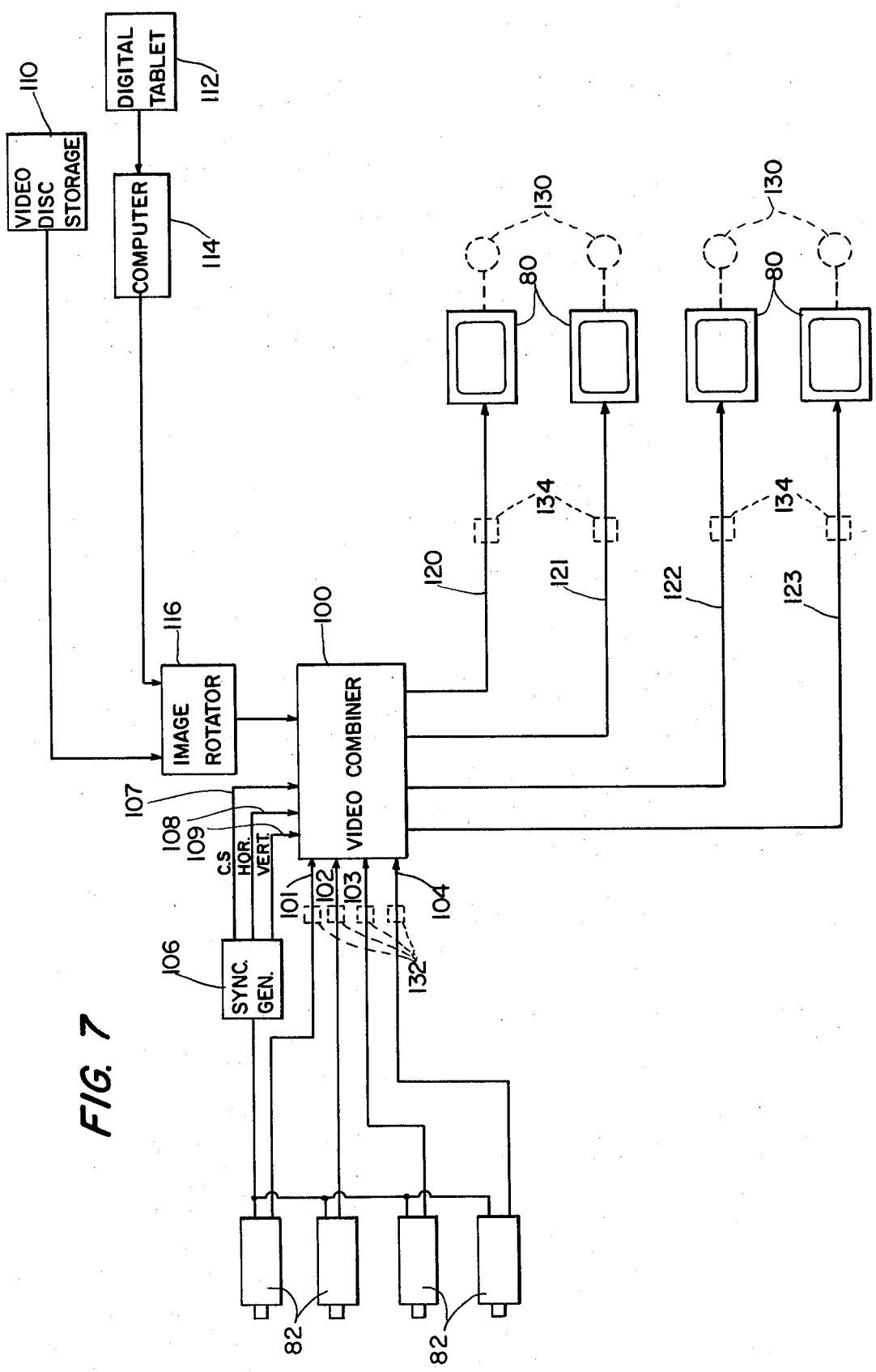
FIG. 7 is a schematic circuit diagram of the table top display feature of the system.

A block diagram of the graphic display system is shown in FIG. 7. Four overhead video cameras 82, one at each of the stations of the system, provide video signals to a video combiner 100 on four inputs 101, 102, 103 and 104 thereof. Cameras 82 are synchronized by synch signals from a synch generator 106 which also provides composite synch, horizontal synch and vertical synch signals on input leads 107, 108 and 109 to video combiner 100.

A video disc storage device 110 provides an additional image signal, such as a signal representing a particular page stored in the disc memory of video disc storage 110. The "MCA Discovision" optical video disc system available from MCA Discovision, Inc. may be used as video disc storage device 110. This system is a microprocessor-based programmable audiovisual information system and provides digital keyboard means for accessing to one of 54,000 indexed frames.

Another input may be taken from a digital tablet 112, which may be the "Bit Pad One" data tablet/digitizer available from Summagraphics Corporation. This tablet permits a conferee to draw on the tablet with a stylus while the tablet generates digital signals of the X and Y coordinates of the stylus. The digital output from digital tablet 112 is coupled to a specialized computer 114, such as the "Ramtek" unit available from Ramtek Corporation, for converting the digital input from tablet 112 to a raster scan display signal. The signals from video disc storage 110 and computer 114 may be inputted directly into video combiner 100. In that case, the images would have a fixed orientation with respect to the virtual conference space of the system and would appear "right side up" on only one of the graphic display screens 90 at only one station. In order to permit the image signals to be "rotated" so that a selected display device 80 at a selected station will display images from disc storage 110 and digital tablet 112 with a desired orientation, the signals from storage 110 and computer 114 are coupled through an image rotator 116. This image rotator, which may be of the type disclosed in U.S. Pat. No. 3,700,792, enables a conferee, or a technician servicing the system, to cause the display of these images to be rotated on the cathode ray tube of display device 80. The output from image rotator 116 is applied to an input of video combiner 100. As will be explained presently, video combiner 100 provides a composite video output which is applied through leads 120, 121, 122 and 123 to the four video display devices 80 at the four stations of the system.

The "electronic table top" comprises a screen 90 which is more or less flat on a table top in the center of the virtual conference space at each teleconference site. The surrogate and actual conferees are clustered around a small table with such a screen. The flat "target" space 96 between each actual conferee position and the centered screen 90 is imaged by an overhead camera 82 and displayed on the centered screen. A conferee could thus "share" material, such as a book, map, or note by introducing the material into the target space or by drawing directly on a drawing surface in the target space. This drawing surface, for example, could be a porcelain panel drawn on with felt-tip markers or a pad of paper drawn upon with a pencil. It is desirable that such shared material appear on the display screen oriented just as for a real table top: upside down for someone across the table, for example. This preserves spatial consistency and extends the illusion of the virtual conference space. When a conferee's hand goes into the shared space, it appears to other conferees at other sites to be coming from the direction of that conferee, confirming the feelings of sitting about a shared virtual conference space. To share a book, it must be rotated to be right side up for the surrogate of the conferee designated to read the book.

In order to provide this effect, display devices 80 are relatively rotated with respect to virtual conference space 26A, 26B, 26C or 26D. This is illustrated in FIG. 1. Consider, first, the situation at station B. Display screen 90 is facing so that the top of the screen points in a direction indicated by arrow 125; this direction will, for purposes of discussion, be designated as the 0° direction. The overhead camera 82 scanning target panel 98 will also be oriented with the top of camera image pointing in the direction of arrow 125, or in the 0° direction. At station A, display device 80 is physically rotated so that its screen 90 has its top pointing in the direction of arrow 126, also designated as the 90° direction because direction 126 is oriented 90° from direction 125. So that the image of target panel 98 at station A as seen by the overhead camera at station A will appear right side up on the display screen 90 at station A, the overhead camera is also rotated 90°. At station D, the display device 80 is rotated an additional 90° so that the top of screen 90 now points in the direction of arrow 127 which, as indicated is oriented 180° from the direction of arrow 125 of station B. In effect, the screen 90 at station D is upside down. The overhead camera at station D is also upside down so that the image of the target panel 98 at station D as seen by the conferee at station D will appear right side up. At station C, display device 80 is rotated an additional 90° to orient screen 90 so that the top of the screen points in the direction of arrow 128 which, as indicated, is 270° from the direction of arrow 125 at station B. Again, the overhead camera scanning target panel 98 at station C must be rotated an additional 90° so that the image of target panel 98 at station C appears right side up to the conferee at station C.

The proper "rotation" of the display devices 80 and overhead cameras 82 at each station may be effected mechanically by the technician setting up the system who should take care to insure that the respective display devices and cameras are properly oriented. The proper orientation of display devices 80 may also be achieved, as shown in dash line in FIG. 7, by providing drive motors 130 mechanically coupled to rotate display devices 80. Similar drive motors (not shown) may be provided for mechanically rotating overhead cameras 82. It is also possible to achieve this result electronically. This is shown in dash line in FIG. 7 where electronic image rotators 132, which may be substantially identical to image rotator 116, are inserted between overhead cameras 82 and the respective inputs 101, 102, 103 and 104 of video combiner 100. Additional image rotators 134, of the same type, are inserted in lines 120, 121, 122 and 123 between video combiner 100 and respective display devices 80. These image rotators are adjusted to provide the appropriate orientation of the camera image signals and of the images on the display devices 80.

Figure 8:
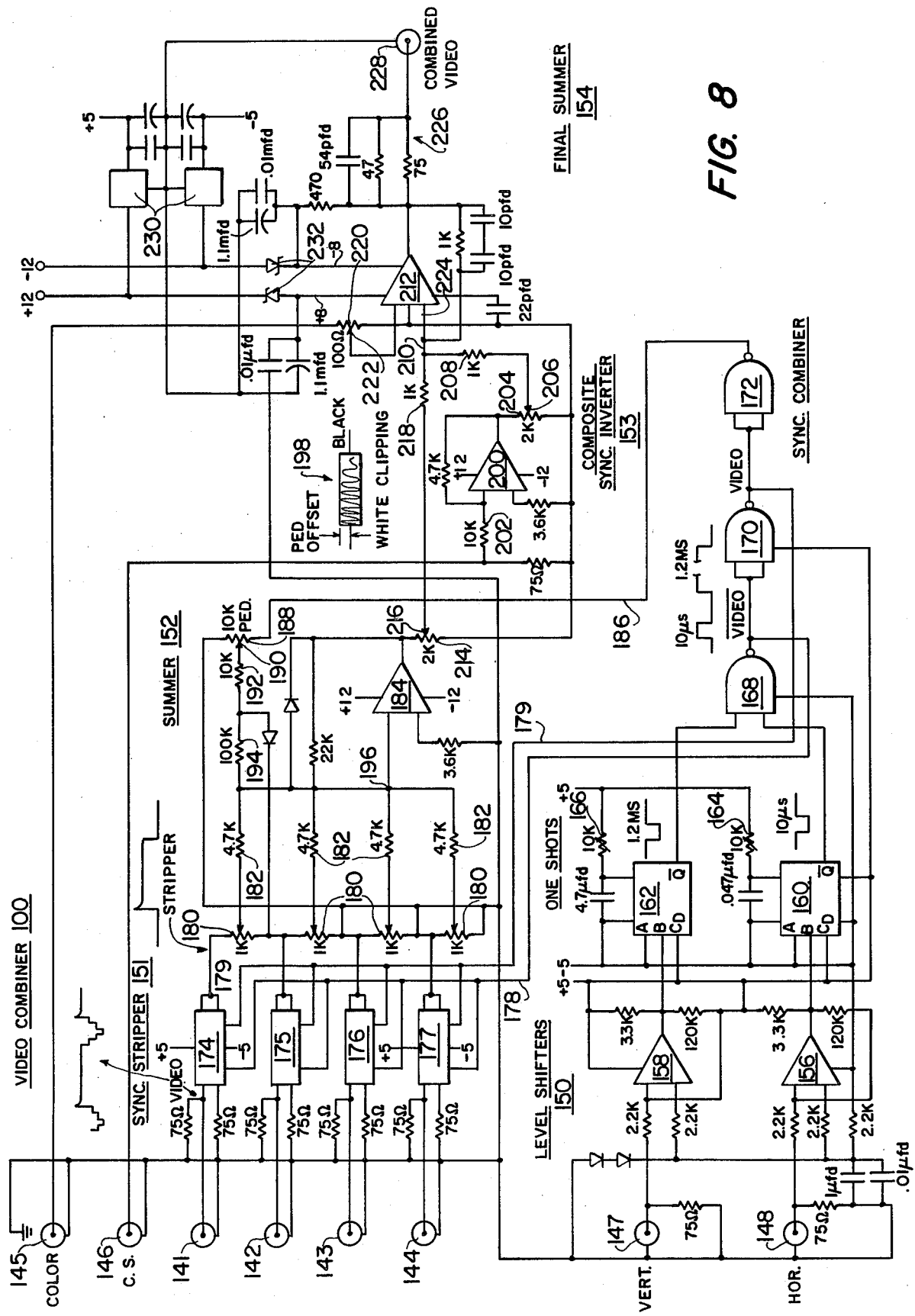
FIG. 8 is a schematic circuit diagram of the video combiner circuit of the system.

As shown in FIG. 8, the video combiner 100 accepts four black and white video signals from overhead cameras 82 on coaxial input terminals 141, 142, 143 and 144, a color video signal from image rotator 116 (FIG. 7) on input terminal 145, a composite synch signal on coaxial input terminal 146 from synch generator 106 (FIG. 7), and vertical and horizontal synch signals from synch generator 106 on coaxial input terminals 147 and 148. Video combiner 100 includes horizontal and vertical level converters or shifters 150, a black and white synch cancellation or stripper circuit 151, a black and white summer 152, a composite synch inverter 153, and a final summer 154.

The horizontal and vertical level converter circuit 150 accepts standard horizontal and vertical synch pulses on 75 ohm coaxial connectors 148 and 147. These pulses are negative going 5 volt signals and are respectively connected through 2.2 K resistors to input terminals of comparators 156 and 158 which convert them to −5 and +5 volt signals in phase. MM 74C909 devices may be used as the comparators. The actual slice level is set at −1.2 volts DC and hysteresis is provided for around each comparator. The negative true pulses provided at the outputs of comparators 156 and 158 are then stretched in time in a pair of one shot circuits 160 and 162; these may be in the form of MC14528 (dual one shots). The time of each active (negative) signal is adjustable through the use of 10 K variable resistors 164 and 166 is each one-shot circuit. The duration must be adjusted so that all channels will have pulse cancellation.

The negative true signals from one-shots 160 and 162 are then combined in a NAND gate (negative NOR) 168, which may be a MC 14011 quad NAND gate. The output is a VIDEO signal which is again inverted in a similar NAND gate 170; the output is the VIDEO signal. This signal is again inverted in another such NAND gate 172.

Synch pulse cancellation circuit or stripper 151 uses four single pole, double throw CMOS transmission switches 174, 175, 176 and 177; these switches may be CD 4066 or MC 14066 units. The black and white video signals on terminals 141, 142, 143 and 144, which are received from the overhead video cameras 82, are respectively connected to the input sides of these switches, or gates. When a specific gate is placed at a positive potential, the impedance between the input and output is approximately 60 ohms; when the gate signal is low or negative, the impedance is $10^{12}$ ohms (one tetra ohm) between input and output terminals. The gate drive is from the VIDEO and VIDEO pulse trains discussed previously, which are provided, respectively, on lines 178 and 179. Switches 174, 175, 176 and 177 are driven on one leg by the black and white camera signals appearing on inputs 141, 142, 143 and 144. The alternate leg presents an equivalent impedance to ground (75 ohms). During the time the synch pulse is present, the grounded leg is presented to the output. At all other times the output is the video signal.

Each output is applied through a 1 K potentiometer 180 to ground. The variable tap outputs from potentiometers 180 are connected through 4.7 K summing resistors 182 to a summing amplifier 184 which has an inverting gain of 4.7.

Summing amplifier 184 also receives a gated DC voltage derived from the combined synch signal NAND gate 172 on line 186; this is applied to a 10 K pedestal adjusting potentiometer 188, the tap 190 from which is connected through a 10 K resistor 192 and a 100 K resistor 194 to the summing junction 196 of summing amplifier 184. Pedestal adjusting potentiometer 188 permits control of the white clipping level of the summed black and white video signal as illustrated by waveform 198. This permits the operator to reduce the relative intensity of the white level of the combined black and white signal and provide a ghosting effect for the images derived from the overhead cameras. Thus, for example, when a conferee places his hand within the target area the image of the hand will appear on display devices 80 as a ghostlike overlay on the image derived from the video disc storage device. Variable level control is thus provided for the individual signals by potentiometers 180 and for the pedestal by potentiometer 188.

Composite synch inverter 153 includes an amplifier 200, which receives the composite synch signal from input 146 through a 10 K resistor 202 and provides a gain of minus one-half. The reduced composite synch pulse is then taken off a 2 K potentiometer 204 through tap 206 and a 1 K summing resistor 208 to a summing junction 210 of the summing amplifier 212 of final summer 154. A 2 K potentiometer 214 on the output side of summing amplifier 184 provides the composite black and white signal derived from the overhead cameras and applies this combined signal through tap 216 and a 1 K summing resistor 218 to summing junction 210 of summing amplifier 212. The color video input signal (derived, for example, from video disc storage device 110) appearing on input terminal 145 is coupled through a 100 ohm resistor 220 leading to a second input of summing amplifier 210. A third input to summing amplifier 210 is received from a variable tap 222 on resistor 220. Summing amplifier 212 is a high current driver operational amplifier which may be a NE5539 unit. The composite signal on summing junction 210 is applied on an inverting port 224 (pin 14 of the NE5539 unit). On the other hand, the color signal from resistor 220 is applied to non-inverting inputs (pins 1 and 7 of the NE5539 unit). Amplifier 212 provides a fixed gain of 5 (non-inverting) to the color input signal and a gain of minus one to the composite black and white and composite synch signal. Potentiometer tap 222 permits adjustment of the level of the color video signal, and potentiometers 214 and 204 permit adjustment of the level of the composite black and white signal and the composite synch signal, respectively. The output from summing amplifier 212 is applied through a line matching circuit 226 to a coaxial output connector 228 which couples the combined video output signal to display devices 80. Video combiner 100 includes integrated circuit voltage regulators 230 to provide regulated voltages to summing amplifier 212 with a pair of zener diodes 232. The resulting combined video signal emphasizes the color input on input terminal 145, which will appear with full intensity on display devices 80, while the composite black and white signal from the overhead cameras will be reduced in intensity and appear ghost-like on the screen as a semi-transparent overlay.

Figure 9:
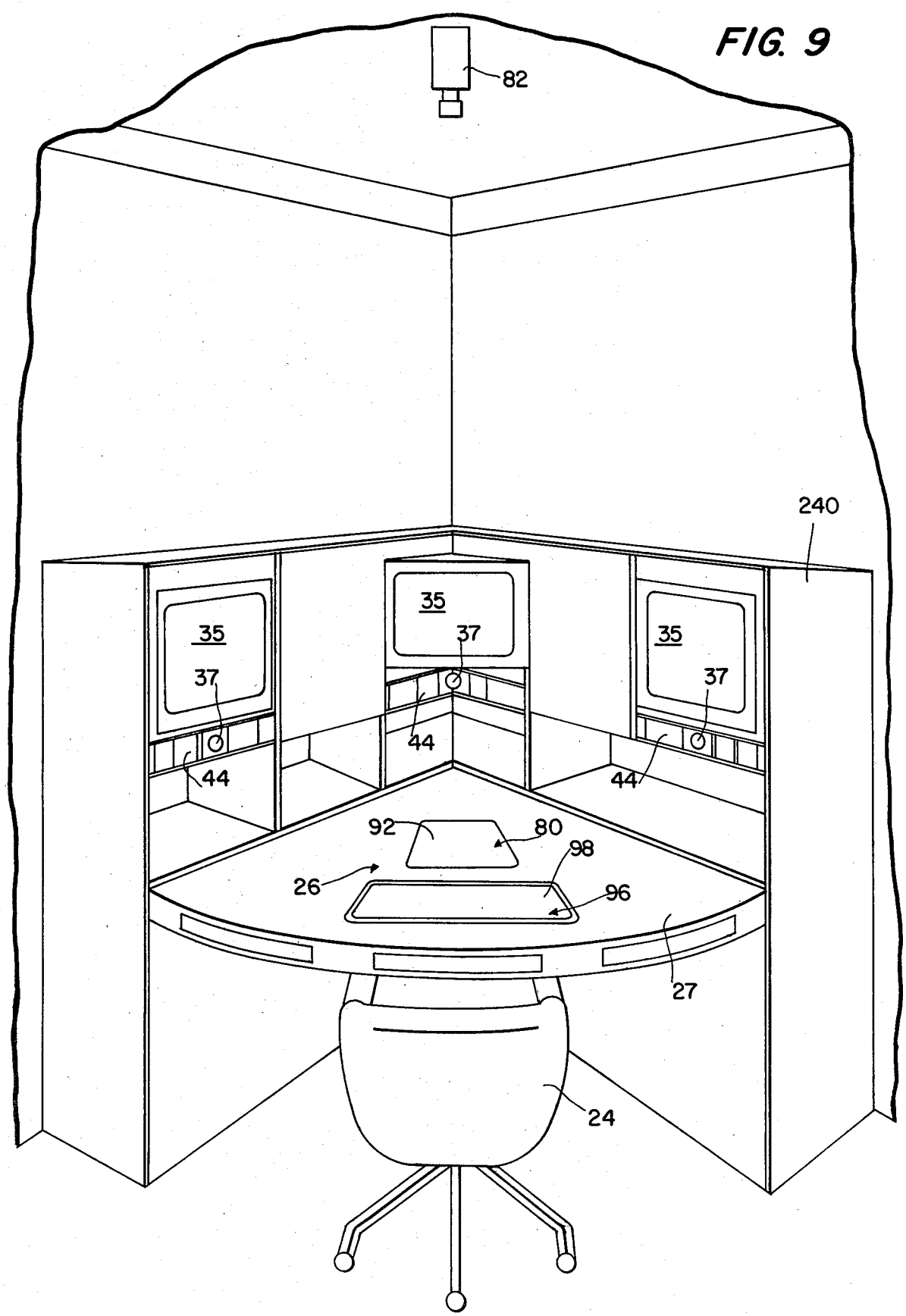
FIGS. 9, 10, 11 and 12 are perspective views showing different forms of a teleconference station according to the invention.

FIGS. 9-12 show several forms of individual stations of teleconference systems of the invention. In FIG. 9, a chair 24 for a conferee is positioned at an "actual" conferee position confronting a virtual conference space 26 provided on a desk 27. Three surrogate conferees, each consisting of a video display device 35, a video camera 37, and a loudspeaker 44 are placed at spaced points, corresponding to conferee positions, on a shelf unit 240. Each of the display devices 35 confronts virtual conference space 26 and faces the actual conferee position represented by the position of chair 24. Video camera 37 of each surrogate is aimed along the same sight line as its display device at the actual conferee position. As was previously explained, the display devices 35 show the image of a conferee at a corresponding conferee position at another station. Each camera 37 forms an image which will be displayed at another station of the system by a surrogate conferee display device located in a conferee position corresponding to the position of the chair in the station shown; this display device will face the actual conferee position at that station. A table top display unit 80 is positioned below transparent panel 92 (see FIG. 6) and is positioned at the center of virtual conference space 26. A target area 96 in the form of a black tablet 98 is located between display device 80 and the actual conferee position of chain 24. Directly above target area 96 is an overhead camera 82 for providing an image of target area 96 for use on display device 80, as has been explained. The microphone for the conferee seated in chair 24 will be worn on his lapel or shirt and is not shown.

Figure 10:
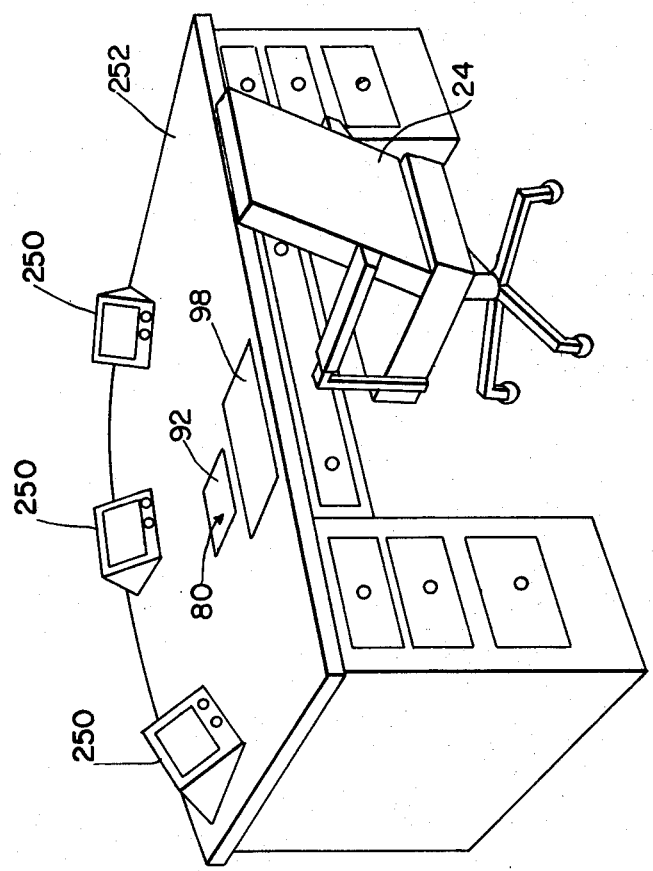

Another form of a station, as shown in FIG. 10, employs pop-up surrogate units 250, incorporating a video display, camera and loudspeaker, which may be hidden in a desk 252 when not in use. The desk also incorporates a table top display device 80 below transparent panel 92 and a target panel 98. In this station, as in the other stations of the system, the same relative position of conferee and surrogate conferees is maintained.

Figure 11:
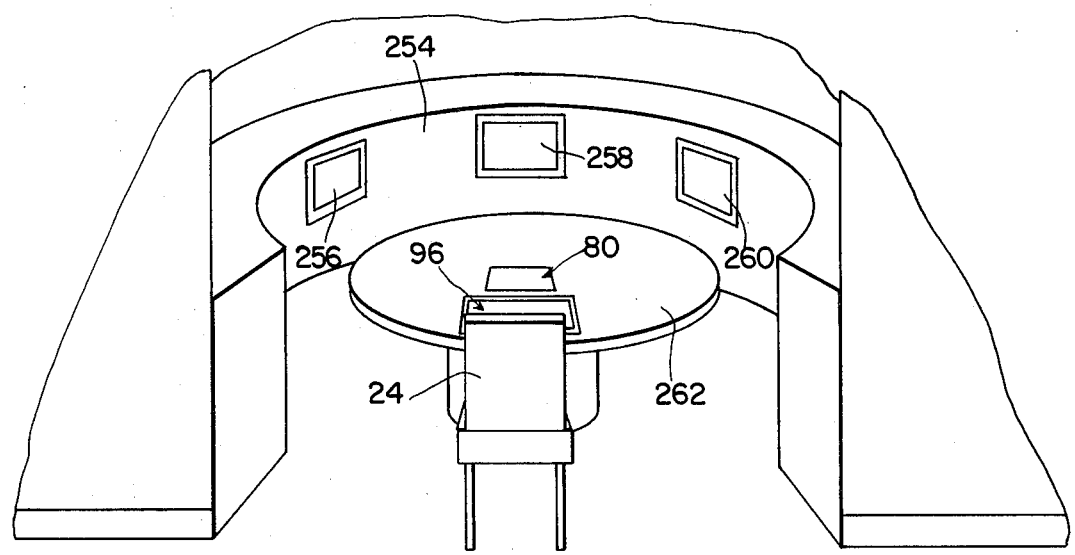

A different arrangement of a station is shown in FIG. 11. Here a curved wall 254 mounts three surrogate conferees 256, 258 and 260, each incorporating a video display, video camera and loudspeaker. The conferee at this station sits in chair 24 at a round table 262. Again, a table top display unit 80 and a target area 96 are provided.

Figure 12:
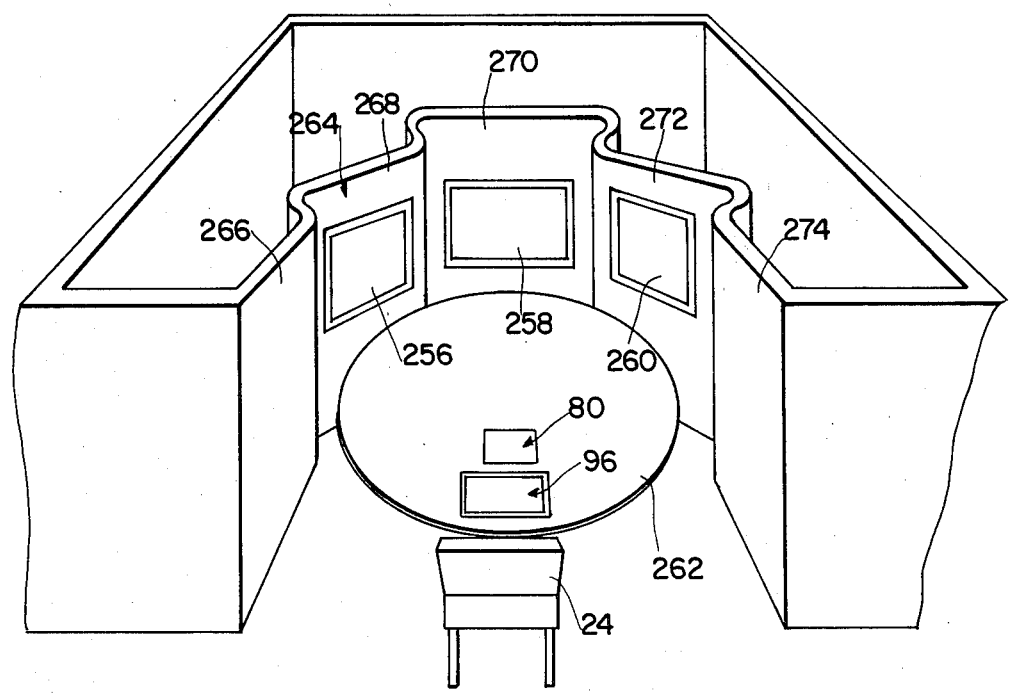

The station shown in FIG. 12 is similar to the station of FIG. 11. However, the curved wall 254 of FIG. 11 is replaced by a wall 264 having a plurality of angularly related panels 266, 268, 270, 272 and 274 which are connected by pleasing arcuate corners.

No matter what the form of the individual stations, which need not be identical in a teleconference system of the invention, the spatial relation among the conferee positions should be maintained.

Although the illustrated embodiment is a system for four conferees at four separate stations, it is contemplated by the invention that more than one conferee be present at a single station in a system having at least two stations. In that case, a set of surrogate conferees will be necessary for each conferee present in person at a station for displaying the conferees at other stations in their proper relative spatial location and for forming images of the conferees present in person to display at the remaining stations.

It is also not necessary for the system to be limited to a fixed number of conferees or a fixed number of stations. A relatively large number of stations could be provided for a relatively large number of conferees. Custom-made teleconference systems according to the invention could then be formed by using cross-bar switching devices for connecting any camera at any station to any display device at any other station. Such a flexible system would be computer controlled. A computer would sense the switches at each station for the desired conferees to determine the conferees selected. The computer will be programmed to set up camera-display relationships to provide consistent seating around the table at each station. In such a system, the use of electronic image rotators or motor drives to orient the table top display devices would be particularly necessary; the computer could be programmed to effect these controls.

Although the embodiment illustrated employs coaxial cable for directly interconnecting stations, more sophisticated intercommunication systems may be employed, particularly for cases in which stations are geographically remote. Any conventional communication techniques can be used for interconnecting remote stations, including multiplex techniques, digital coding, modems, long distance telephone networks, and radio links.

A number of refinements can be added to the system as shown. In addition to the components of a link 42 as shown in FIG. 3, signalling means could be added. For example, the closing of a switch in the control box at one station could sound a chime at the control box of a conferee at another station and turn on a signal lamp next to your name at the other station.

The table top display system could incorporate a number of additional features. In order to further distinguish objects placed in a target space by a conferee, the signal from the overhead camera could be coupled through a colorizer circuit so that the target area image from a particular station will have a unique and distinguishable identifying color. Also, the table top display device at each station could incorporate a touch sensitive display screen. A conferee could introduce a signal to the common display by touching or "writing on" the display screen. It is to be understood, also, that inputs from additional external sources, such as other video storage devices, could be connected to video combiner 100 which should be modified to include this additional input in the combined video output signal.

While a preferred embodiment has been shown and described, it will be apparent to those skilled in the art that changes can be made without departing from the principles and spirit of the invention, the scope of which is defined in the appended claims.

I claim:
1. A teleconference system for N conferees, N being greater than two, comprising:
    a plurality of stations, each station having N conferee positions confronting a virtual conference space, corresponding conferee positions at each station having the same relative locations about the virtual conference space, at least one of the conferee positions at each station being an actual conference position adapted to be occupied by a conferee in person, and video cameras for viewing said actual conferee positions coupled to video display devices at conferee positions at other stations corresponding to the viewed actual conferee positions for displaying the image of the actual conference position at each station at corresponding positions at the other stations, each station having at least (N-1) of said video cameras and video display devices.

2. A teleconference system as recited in claim 1, wherein there are N stations.

3. A teleconference system as recited in claim 1, further comprising a microphone adjacent each actual conferee position and a separate loudspeaker positioned adjacent and directly associated with each said display devices, respectively, the loudspeakers reproducing the voice of the conferee displayed on the adjacent display devices.

4. A teleconference system as recited in claim 1, wherein said conferee positions are located at respective corners of an equilateral figure having N sides.

5. A teleconference system as recited in claim 1, further comprising an additional display device at the same relative location as the virtual conference space at each station.

6. A teleconference system for N conferees, N being greater than two, comprising:
a plurality of stations, each station having N conferee positions confonting a virtual conference space, the sight lines between conferee positions at each station having the same angular relation as the sight lines between corresponding conferee positions at the other stations, at least one of the conferee positions at each station being an actual conferee position adapted to be occupied by a conferee in person, a surrogate conferee means occupying each conferee position not adapted to be occupied by a conferee in person and including display means facing said actual conferee position for displaying the image of a conferee in person at a corresponding position at another station and imaging means viewing said actual conferee position along substantially the same sight lines as said display means for forming an image of said actual conferee position, means for coupling said image of said actual conferee position to the display means of a surrogate conferee position corresponding to said actual conferee position at said another station, said conferee position are located at respective corners of an equilateral figure having N sides, image supply means for supplying a composite image signal to said display device at each station, and said image supply means includes a source of image signal and means for rotating said image signals to have a selected orientation when reproduced on said display screen.

7. A teleconference system for N conferees, N being greater than two, comprising:
a plurality of stations, each station having N conferee positions confronting a virtual conference space, the sight lines between conferee positions at each station having the same angular relation as the sight lines between corresponding conferee positions at the other stations, at least one of the conferee positions at each station being an actual conferee position adapted to be occupied by a conferee in person, a surrogate conferee means occupying each conferee position not adapted to be occupied by a conferee in person and including display means facing said actual conferee position for displaying the image of a conferee in person at a corresponding position at another station and imaging means viewing said actual conferee position along substantially the same sight lines as said display means for forming an image of said actual conferee position, means for coupling said image of said actual conferee position to the display means of a surrogate conferee position corresponding to said actual conferee position at said another station, said conferee positions are located at respective corners of an equilateral figure having N sides, image supply means for supplying a composite image signal to said display device at each station, each actual conferee position has a target space between said conferee position and said display screen, and wherein said image supply means further comprises an imaging device for forming a target image signal from each said target space, and means for mixing the target image signals formed by the imaging devices at each station and an external image signal from an external source.

8. A teleconference system as recited in claim 7, wherein said display devices are video monitors, wherein said image signals are video signals, and said imaging devices are video cameras directly above said target spaces.

9. A teleconference system as recited in claim 7, wherein said image device and display device at each station are so oriented relative to said virtual conference space that the image of a target space will be oriented on said display screens with the same orientation as the target space from which the image is derived has with respect to said virtual conference space.

10. A teleconference system for a plurality of conferees, comprising:
a plurality of stations, each station having a plurality of conferee positions confronting a virtual conference space, the conferee positions at each station having the same angular relation to the virtual conference space as corresponding conferee positions at the other stations, at least one of the conferee positions at each station being an actual conferee position adapted to be occupied by a conferee in person, a display device at the same relative location as the virtual conference space at each station, said display device is at the center of said virtual conference space at each station, said display device comprises a display screen at substantially the level of a table top, each actual conferee position has a target space between said conferee position and said display screen, and wherein said system further comprises imaging means for forming a target image signal from each said target space and mixing means for mixing said target image signals to form a composite image signal, and composite image signal being coupled to each display device.

11. A teleconference system as recited in claim 10, further comprising means for supplying a composite image signal to said display device at each station, including a source of image signals and means for rotating said image signals to have a selected orientation when reproduced on said display device.

12. A teleconference system as recited in claim 10, wherein said display devices and imaging means are so oriented relative to said virtual conference space that the target images appearing on said display devices have the same orientation relative to said virtual conference space as the target spaces from which the images are derived.

13. A teleconference system as recited in claim 12, wherein said display devices are video display devices, said imaging means are video cameras scanning said target spaces and said image signals are video signals.

14. A teleconference system as recited in claim 13, wherein said video cameras are directly above said target spaces.

15. A teleconference system as recited in claim 12, further comprising an external source of external image signals coupled to said mixing means to form part of said composite image signals.

16. A teleconference system as recited in claim 15, wherein said mixing means includes means for reducing the intensity of said target image signals relative to said external image signals.

17. A teleconference system as recited in claim 15, wherein said external source is a video image storage device.

* * * * *